June 30, 1953     S. C. OLSZEWSKI     2,643,920
TURRET ROLLER BEARING
Filed Sept. 10, 1948     3 Sheets-Sheet 1
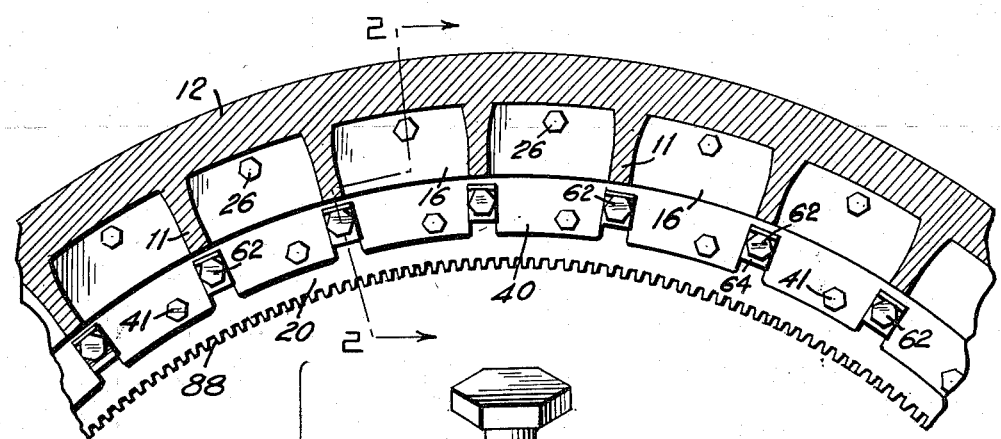
Fig. 1.
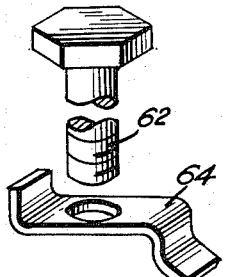
Fig. 6.
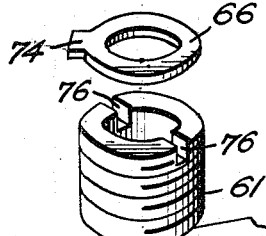
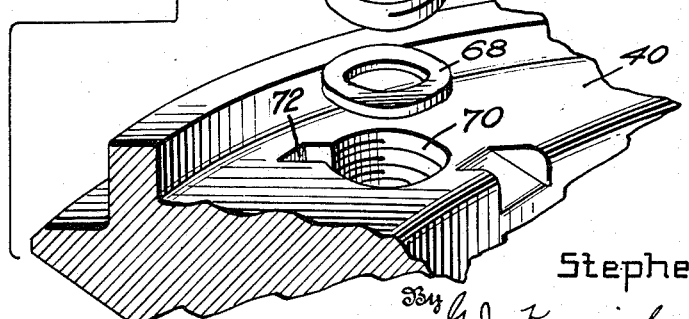
Inventor
Stephen C. Olszewski
By G. J. Kessenich + J. H. Church
Attorneys June 30, 1953 S. C. OLSZEWSKI 2,643,920
TURRET ROLLER BEARING
Filed Sept. 10, 1948 3 Sheets-Sheet 2

Inventor
Stephen C. Olszewski
By G. J. Kessenich + J. H. Church
Attorneys

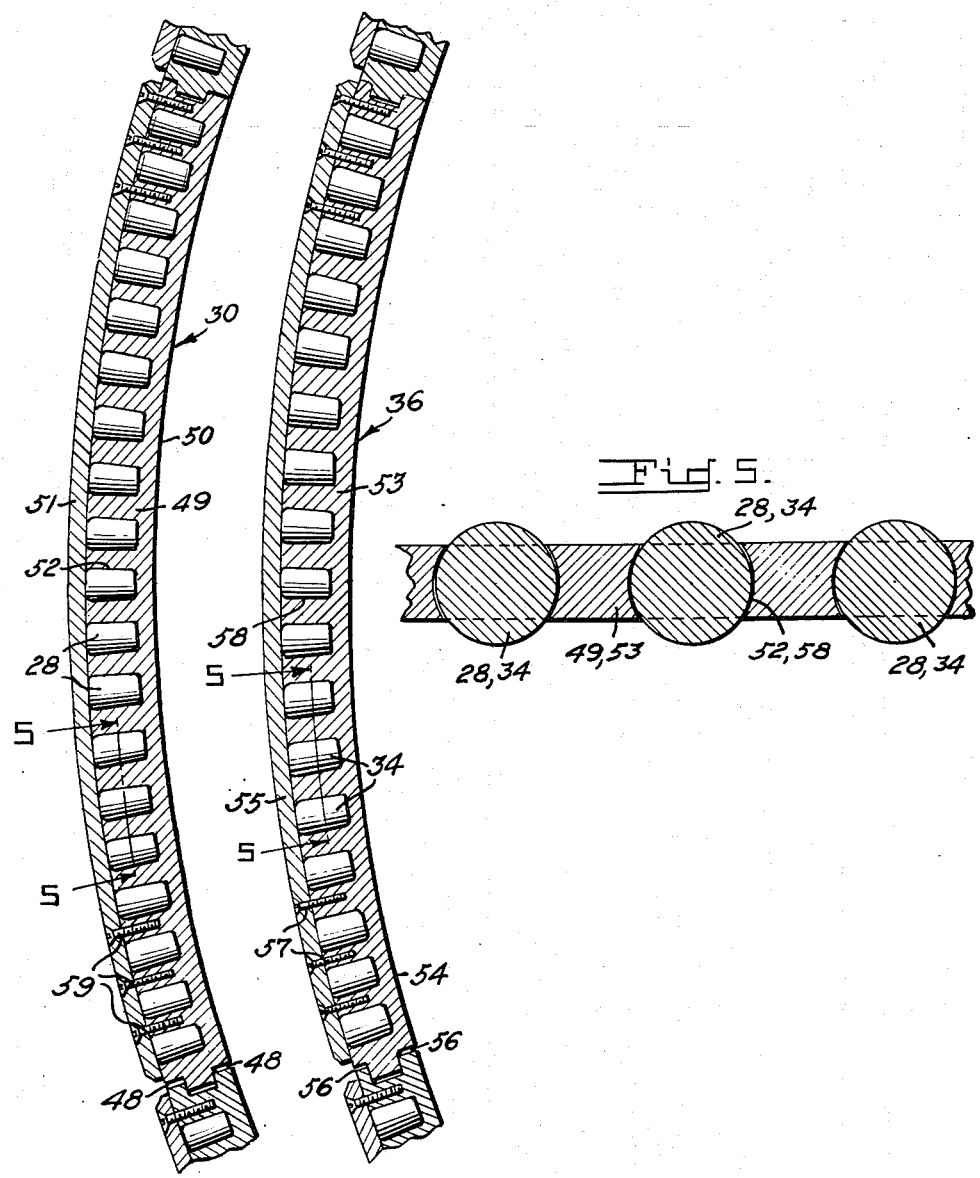

Patented June 30, 1953

2,643,920

UNITED STATES PATENT OFFICE 2,643,920

TURRET ROLLER BEARING

Stephen C. Olszewski, Detroit, Mich.

Application September 10, 1948, Serial No. 48,544

12 Claims. (Cl. 308—231)

(Granted under Title 35, U. S. Code (1952), sec. 266)

This invention relates to a roller bearing structure for supporting a turret, gun mount, or other object rotatably about a vertical axis thereof on a base support. More particularly, this invention relates to an improved roller bearing structure for rotatably supporting, on a base support, an object such as the turret of a tank or combat vehicle wherein the bearing structure is subject to the sudden application of loads in horizontal and vertical directions and combined vibrations resulting therefrom.

The bearing structure for an object such as the rotatable turret of a tank or combat vehicle is subject to a relatively large load in a vertical direction due to the weight of the turret, but in addition the bearing structure is subject to the sudden application of loads in horizontal and vertical directions and resulting vibrations when the vehicle is traveling over rough terrain or upon the firing of a gun mounted in the turret, such sudden application of these loads tending to cause "floating" and jarring of the turret. Present ball bearing structures for this purpose have been disadvantageous in requiring expensive and difficult precision shop work and fine tolerances in their manufacture and assembly. In addition, these ball bearing structures have proven to be unsatisfactory since the sudden application of such loads has resulted in the formation of serious indentations called "brinelling" in the hardened paths traversed by the balls, whereupon rotation of the turret may be difficult or impossible and to that extent rendering the turret ineffective or inoperative and at a time when the necessarily difficult maintenance or repairs may be impossible. This has been true even when the ball bearing structure included a plurality of spring loaded ball races.

It has been suggested to substitute known roller bearing structures for the ball bearing structures for the purpose, these known roller bearing structures generally being undesirably heavier in weight and also being disadvantageous similarly to the ball bearing structures as above described in including cumbersome selective parts requiring expensive and difficult precision shop work and fine tolerances in their manufacture, assembly, and maintenance, in an attempt to overcome the above described unsatisfactory performance of ball bearing structures. Furthermore, such fine or close tolerances may result in excessive looseness or tightness in the bearing structure of the turret of a tank vehicle, for example, which may be subject to operation or assembly in widely varying temperatures causing expansion or contraction. Furthermore, weight consideration must be given to any roller bearing structure for an object such as the turret of a tank vehicle where it is highly desirable that the weight of the bearing structure be reduced to a minimum consistent with necessary performance, since for practical purposes such weight must not be so great as to detract from desired operational characteristics of the turret and the tank vehicle, while at the same time it is highly desirable that a minimum number of roller races be embodied and so arranged in the structure as to result in economy, efficiency, and simplicity in construction, assembly, and maintenance.

Accordingly, it is the broad purpose of this invention to provide an improved roller bearing structure for an object such as the turret of a tank vehicle subject to the application of sudden loads in horizontal and vertical directions, which improved roller bearing structure avoids the aforesaid disadvantages and unsatisfactory performance of known bearing structures for this purpose.

A particular object of this invention is to provide, for the purpose described, an improved roller bearing structure which will not allow the turret or like object to be lifted or moved sideways from its position, thereby eliminating any floating or jarring of the turret or like objects.

Another particular object of this invention is to provide an improved roller bearing structure for the purpose described, constructed to avoid the formation of serious indentions in the surfaces of the paths traversed by the rollers thereof.

Another particular object of this invention is to provide an improved roller bearing structure for the purpose described which avoids any necessity of including selective parts therein and which eliminates substantially entirely any necessity for precision shop work and fine tolerances in its construction, whereby the latter is relatively economical in construction, assembly, and maintenance.

Another object of this invention is to provide an improved roller bearing structure for the purpose described which is relatively light in weight with respect to known roller bearing structures to provide optimum operational characteristics.

Still another particular object of this invention is to provide an improved roller bearing structure for the purpose described which is readily and easily adjusted and locked in assembled position.

The specific nature of this invention as well as other objects and advantages thereof will clearly appear from a description of a preferred embodiment as shown in the accompanying drawings in which:

Figure 1 is a plan view of a sector portion of the turret roller bearing structure of this invention, with the turret broken away.

Figure 3 is a view taken on a plane indicated by the line 3—3 of a portion of the horizontal roller retainer with rollers.

Figure 4 is a view taken on a plane indicated by the line 4—4 of Figure 2 of a portion of the angular roller retained with rollers.

Figure 5 is a fragmentary view, not a true projection, taken on a plane indicated by the line 5—5 of either Figure 3 or 4.

Figure 6 is an exploded view of the adjustable locking means showing the elements thereof.

Reference to these views will now be made by use of like characters which are employed to designate corresponding parts throughout.

Figure 2:
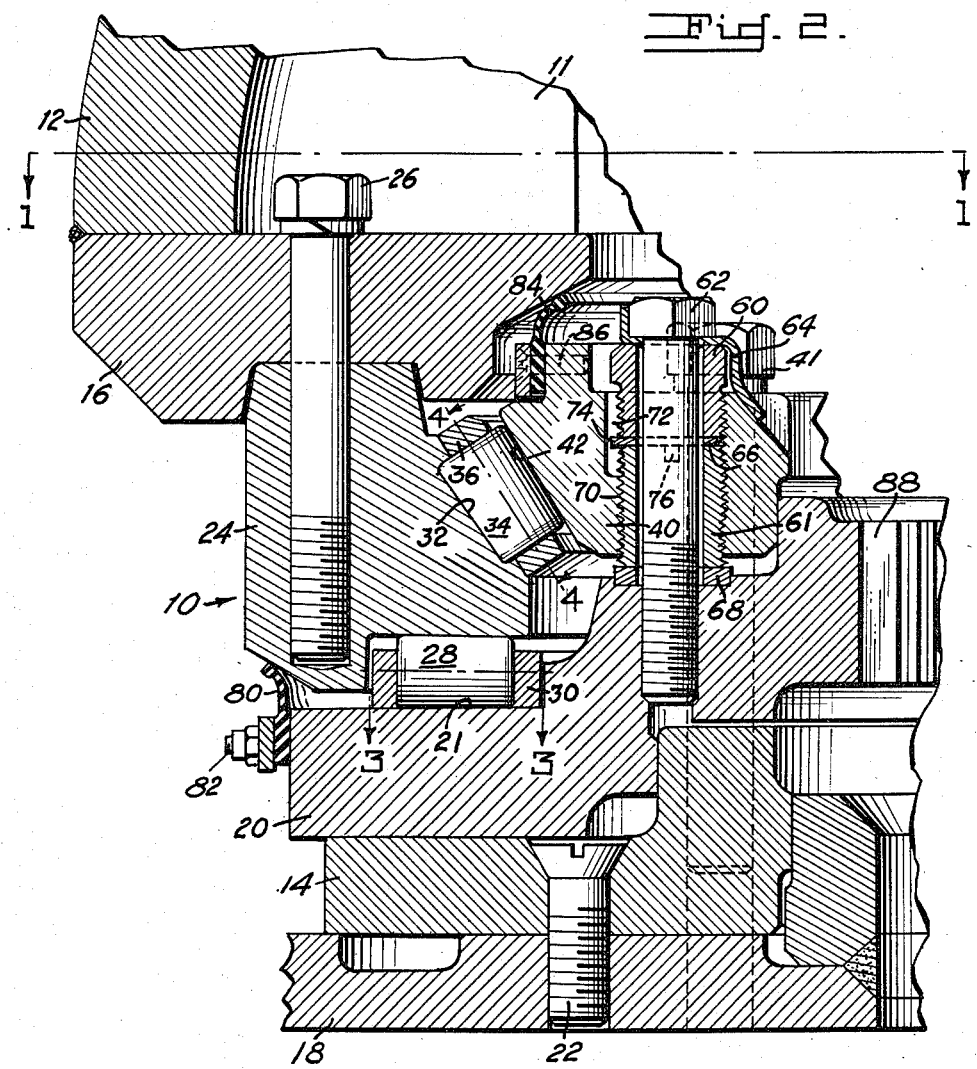
Figure 2 is a vertical section taken on the line 2—2 of Figure 1.

Exemplifying this invention, there is indicated a turret 12 with braces 11 thereof welded to, but which may be formed integrally with, a base ring 16. Turret 12 is rotatably supported at base ring 16 thereof by means of the roller bearing structure, generally indicated by numeral 10, on base ring 20 bolted by means of bolts 41 to an adapter 14, which in turn is secured as by bolts 22 to a base support 18, the latter forming a portion of the hull of a tank vehicle (not shown).

Referring now particularly to Figure 2 of the drawings, roller bearing structure 10 includes a base ring 20 having formed thereon, as by hardening, a horizontal roller race 21. A turret ring member 24 above horizontal roller race 21 is bolted by means of bolts 26 to turret base ring 16 and is rotatably supported on and by horizontal rollers 28 in lower horizontal roller retainer 30, hereinafter described in detail, between horizontal roller race 21 and ring member 24. An angular roller race 32 is provided on the inner side of ring member 24 above horizontal rollers 28, roller race 32 being so constructed that it is at an angle to the vertical of about 30 to 40 degrees, preferably about 35 degrees, and extending radially outward and upward, for correspondingly angularly disposed angular rollers 34 in angular or tapered roller retainer 36, the latter being similar in construction to horizontal roller retainer 30 as hereinafter pointed out. Radially inward of turret base ring 16 and ring member 24, and above base ring 20, a locking ring member 40 is secured to base ring 20, adapter 14, and hence to base support 18 by means of a plurality of circumferentially spaced screws 41 threadably received in adapter 14. Locking ring member 40 has an outward angular bearing surface 42 formed at an angle to the vertical corresponding to angular roller race 32 inwardly thereof and bearing opposite the latter on angular rollers 34.

Horizontal roller retainer 30 is composed of a number of sectors or arches, for example 8 sectors 50 of about equal length such that when assembled they form a large ring with a slight gap 48 therein, for example of about 1/16" to 3/8". As best seen in Figure 3, each sector 50 has a body portion 49 with an outer portion 51 held thereon by screws 59, and has a number, for example nineteen, of roller seats 52 for as many horizontal rollers 28, roller seats 52 being relatively unequally spaced laterally for a purpose hereinafter pointed out. Angular or tapered roller retainer 36, indicated in Figure 4, is similar in construction to horizontal roller retainer 30 above described, and is composed of a number of sectors or arches 54, for example 8 sectors 54 of about equal length such that when assembled they form an angular or tapered ring with a slight gap 56 therein on the order of 1/16" to 3/8". Each sector 54 has a body portion 53 with an outer portion 55 held thereon by screws 57, and has a number of, for example seventeen, roller seats 58 for as many angular rollers 34, roller seats 58 being relatively unequally spaced laterally. It will be understood by those skilled in the art that horizontal rollers 28 and angular rollers 34 in respective seats 52 and 58 necessarily may be slightly tapered.

Referring to Figures 2 and 6, locking ring member 40 is shown with an adjustable locking arrangement including locking nuts 60, adjusting plugs 61, locking screws 62, and washers 64, 66, and 68. Locking ring member 40 is tapped to provide a plurality of, for example twenty-eight, vertically extending and circumferentially spaced threaded holes 70 each adapted to threadably receive therein an adjusting plug 61 and a locking nut 60. Each threaded hole 70 is provided with a longitudinally extending slot 72 at one side thereof to accommodate lug 74 on friction washer 66. Adjusting plug 61 is provided with a screw driver slot 76 whereby plug 61 may be screwed in threaded hole 70 for adjustment purposes. On base ring 20, between the latter and adjusting plug 61, is a hardened steel washer 68. Extending longitudinally through locking nut 60, friction washer 66, adjusting plug 61, and washer 68, is a locking screw 62 threadably received in base ring 20 and held in tightened position by means of locking washer 64. It is to be understood that with sufficient hardness of base ring 20, hardened steel washers 68 thereon may be eliminated.

A customary annular outer seal member 80, in the form of a ring of rubber or other suitable material, is shown secured to base ring 20 by means of a plurality of circumferentially spaced screws 82, outer seal member 80 bearing on a surface of turret ring member 24 to prevent entrance of water or other material. Similarly, a customary annular inner seal member 84, in the form of a ring of rubber or other suitable material, is secured to locking ring member 40 by means of a plurality of circumferentially spaced screws 86, inner seal member 84 bearing on base ring 16. As is further customary, a rack 88 is provided circumferentially on base ring 20 for operative connection with the usual traversing mechanism (not shown).

In assembling the structure, all of the parts of the above described turret roller bearing, with the exception of locking nuts 60, adjusting plugs 61, locking screws 62, and washers 64 and 66, are assembled and lubricated by semi-skilled labor, screws 41 being loose. Then it is ascertained whether turret ring member 24 rotates freely and properly, and, if such is the case, adjusting plugs 61 are then turned in place with screw driver means and slots 76 until plugs 61 touch the surface of washers 68 on base ring 20. A friction washer 66 is then placed on top of each of plugs 61, with lug 74 of each friction washer in a respective slot 72 to prevent turning. A locking nut 60 is then tightened on the friction washer in the respective one of each of holes 70. Through locking washers 64 on the tops of locking nuts 60, locking screws 62 are then inserted through locking nuts 60, friction washers 66, adjusting plugs 61, and washers 68, and are then screwed tight in base ring 20. Finally, screws 41 extending through locking ring 40, are screwed into adapter 14 on base support 18 and tightened.

It will thus be seen that the above described adjustable locking arrangement permits ready and easy locking and adjustment while eliminating any necessity of using expensive and cumbersome selective parts. It will further be seen that with the described construction of the horizontal and angular roller retainers with respective rollers therein, when turret ring member 24 is being revolved, even for a very short distance, all rollers will leave their respective positions. Also, as a result of the unequal spacing or subdivision and the gap as above described, no roller will reoccupy its former station on its respective race even though turret ring member 24 has made a complete revolution. This feature is a very important improvement over bearing structures heretofore used, since the rollers in accordance with this invention will never stay long enough in the same spot on a roller race to make any serious indentations upon the hardened surface of the path, every slight movement of the turret rearranging the relative roller positions completely. The complete turret roller bearing stucture of this invention makes it possible to eliminate substantially entirely heretofore required precision shop work and fine tolerances, thereby resulting in economy in assembly and maintenance while permitting manufacture on a much more economical basis and with a desirable minimum weight for desired performance characteristics.

It will be understood that dimensions, the number of rollers, and the number of sectors of each roller retainer member of the roller bearing structue of this invention will vary according to conditions under which it is to be used, in order to obtain satisfactory performance. Thus, by way of example only and not limited thereto, with a turret having an outside base diameter of about 6 feet, each roller retainer may comprise 8 to 12 sector portions adjoiningly forming a ring having a gap therein of $\frac{3}{16}$" minimum; each sector portion may have 17 to 19 rollers therein each of a diameter of about 1⅛"; and the rollers of each sector may be relatively unequally laterally spaced at varying distances correspond to 1½° to 2½° circumferentially of the sector.

Although I have shown and described certain embodiments of my invention, it will be understood that I do not wish to be limited to the exact construction shown and described, but that various changes and modifications may be made without departing from the spirit and scope of my invention as defined in the appended claims.

The invention described herein may be manufactured and used by or for the Government for governmental purposes without the payment of any royalty thereon.

I claim:

1. Turret roller bearing structure for supporting a turret rotatably at its base and about its vertical axis on a base support, said structure comprising a base ring member on said base support, a turret ring member on said turret base above said base ring member, a locking ring member secured to said base ring member and radially inward of said turret ring member, a horizontal roller retainer with rollers therein between said base ring member and said turret ring member, and a tapered roller retainer with rollers therein inclined at an angle of about 30° to 40° from the vertical in extending upwardly and radially outwardly between said turret ring member and said locking ring member, each of said roller retainers comprising a plurality of adjoining sector portions each containing a plurality of unequally spaced rollers therein, said adjoining sector portions forming a ring with a gap therein.

2. Turret roller bearing structure for supporting a turret rotatably at its base and about its vertical axis on a base support, said structure comprising a base ring member on said base support, a turret ring member on said turret base above said base ring member, a locking ring member secured to said base ring member and radially inward of said turret ring member, a horizontal roller retainer with rollers therein between said base ring member and said turret ring member, a tapered roller retainer with rollers therein inclined at an angle of about 30° to 40° from the vertical in extending upwardly and radially outwardly between said turret ring member and said locking ring member, each of said roller retainers comprising a plurality of adjoining sector portions each containing a plurality of unequally spaced rollers therein, said adjoining sector portions forming a ring with a gap therein, and means for adjustably locking said locking ring member in position.

3. The bearing structure as set forth in claim 2, wherein said means for adjustably locking said locking ring member in position comprises an adjustable adjusting plug carried by said locking ring member and adapted to contact said base ring member, a locking nut carried by said locking ring member for locking said adjusting plug in adjusted position, and a locking screw extending through said locking nut and adjusting plug and threadably received in said base ring member.

4. In combination with a rotatably mounted turret supported at its base by a base support, a base ring member on said base support and providing on its upper side a horizontal ring-shaped roller race, a turret ring member on said turret base above said base ring member and providing on its radially inner side a tapered ring-shaped roller race inclined from the vertical in extending upwardly and radially outwardly, a locking ring member on said base ring member and spaced radially inward of said turret ring member, means for adjustably locking said locking ring member in position on said base ring member a horizontal ring-shaped roller retainer with rollers therein between said base ring member and said turret ring member, and a tapered ring-shaped roller retainer with rollers therein inclined from the vertical in extending upwardly and radially outwardly between said turret ring member and said locking ring member, each of said roller retainers comprising a plurality of adjoining sector portions each containing a plurality of unequally spaced rollers therein, said adjoining sector portions forming a ring with a small gap therein.

5. In combination with a rotatably mounted turret supported at its base by a base support, a base ring member carried on said base support, a turret ring member carried by said turret base above said base ring member, a locking ring member carried by said base ring member and radially inward of said turret ring member, a horizontal ring-shaped roller retainer with horizontal rollers therein between said base ring member and said turret ring member, a tapered ring-shaped roller retainer with rollers therein inclined at an angle of about 35° from the vertical in extending upwardly and radially outwardly between said turret ring member and said locking ring member, each of said roller retainers comprising a plurality of sector portions adjoiningly forming a ring with a gap therein, each of said sector portions containing a plurality of unequally spaced rollers, and adjustable locking means carried by said locking ring member for holding said ring members and rollers in stable and proper assembled position, said means including an adjusting plug adjustable in said locking ring member and adapted to contact said base ring member, a locking nut in said locking ring member for locking said adjusting plug in adjusted position, and a locking screw extending through said locking ring member, locking nut, and adjusting plug, said locking screw being threadably received at one end thereof in said base ring member.

6. In a roller bearing structure of the type described wherein rollers are disposable between a locking ring member and a rotatable object and between the latter and a base support, adjustable locking means carried by said locking ring member for holding said structure in stable and proper assembled position, said means comprising an adjusting plug in said locking ring member and extending from the latter toward said base support, a locking nut carried by said locking ring member for locking said adjusting plug in adjusted position, and a locking screw extending through said adjusting plug and locking nut in said locking ring member for securing the latter to said base support.

7. Turret roller bearing structure comprising a horizontal ring-shaped roller race, a roller race inclined at an angle of from 30° to 40° from the vertical, a roller retainer for each said race and comprised of a plurality of sector portions adjoiningly forming a ring with a small gap therein, and a plurality of unequally spaced rollers in each of said sector portions.

8. In a roller bearing structure for an object such as a turret supported on its base for rotation about its vertical axis, a horizontal ring-shaped roller race for said base, a horizontal ring-shaped roller retainer with horizontal rollers therein for said horizontal roller race, a tapered ring-shaped roller race for said object above said base thereof and inclined at an angle of from 30° to 40° to the vertical, and a tapered ring-shaped roller retainer with rollers therein inclined at an angle of from 30° to 40° to the vertical for said inclined roller race, at least one of said ring-shaped roller retainers being comprised of a plurality of sector portions adjoiningly forming a ring with a small gap therein, each of said sector portions containing a plurality of rollers relatively unequally spaced laterally.

9. In a roller bearing structure for supporting a turret rotatably at its base and about its vertical axis on a base support, the combination of a base ring member carried by said base support, a turret ring member carried by said turret base above said base ring member, a locking ring member carried by said base ring member and radially inward of said turret ring member, horizontally disposed rollers between said base ring member and said turret ring member, rollers disposed at an angle to the vertical in extending upwardly and radially outwardly between said turret ring member and said locking ring member, and adjustable locking means carried by said locking ring members for adjustably holding said ring members and rollers in stable and proper assembled position, said adjustable locking means comprising an exteriorly threaded adjusting plug received within a threaded opening through said locking ring and adapted to adjustably contact the surface of said base ring member, a nonrotatably disposed and constructed friction washer on said adjusting plug in said threaded opening, an exteriorly threaded locking nut received within said threaded opening and adapted to engage said friction washer to lock said adjusting plug in adjusted position, a locking washer on said locking nut, said adjusting plug, locking nut and washers having aligned openings therethrough, and a locking screw extending through said adjusting plug, locking nut, and washers in said openings therethrough and threadably received at one end in said base ring member.

10. In a bearing structure of the type wherein rolling bodies are disposed between a locking ring member and a rotatable object and between the latter and a base support, adjustable locking means carried by said locking ring member for holding said structure in stable and proper assembled position, said means comprising an adjusting plug in said locking ring member and extending toward said base support, a locking nut carried by said locking ring member for locking said adjusting plug in adjusted position, and a locking screw extending through said adjusting plug and locking nut in said locking ring member for securing the latter to said base support.

11. Turret roller bearing structure for supporting a turret rotatably at its base and about its vertical axis on a base support, said structure comprising a base ring member for said base support, a turret ring member for said turret base above said base ring member, a locking ring member secured to said base ring member and radially inward of said turret ring member, a horizontal ring-shaped roller retainer with rollers therein between said base ring member and said turret ring member, a tapered ring-shaped roller retainer with rollers therein inclined at an angle from the vertical in extending upwardly and radially outwardly between said turret ring member and said locking ring member, and adjustable locking means for adjustably locking said locking ring member in position, said adjustable locking means including a threaded opening extending through said locking ring member and having a longitudinal slot therein, an adjustable adjusting plug threadably received in said opening and adapted to contact said base ring member, a friction washer having a lug thereon received in said opening and slot and positioned on said adjusting plug, a locking nut received in said opening for contacting said friction washer to lock said adjusting plug in adjusted position, and a locking screw extending through said locking nut, adjusting plug, and washer and into said base ring member.

12. In combination with an object mounted for rotation about its vertical axis and supported at its base by a base support, an improved roller bearing structure subject to sudden application of loads in horizontal and vertical directions, said structure comprising a base ring member on said base support and providing on its upper side a horizontal ring-shaped roller race, an object ring member on said object base above said base ring member and providing on its radially inner side a tapered ring-shaped roller race inclined from the vertical in extending upwardly and radially outwardly, a locking ring member on said base ring member and spaced radially inward of said object ring member, a horizontal ring-shaped roller retainer with rollers therein between said base ring member and said object ring member, a tapered ring-shaped roller retainer with rollers therein inclined from the vertical in extending upwardly and radially outwardly between said object ring member and said locking ring member, and means for adjustably locking said locking ring member in position including an adjustable adjusting plug carried by said locking ring member and adapted to adjustably engage said base ring member, a locking nut carried by said locking ring member for locking said adjusting plug in adjusted position, and a locking screw carried by said locking ring member and threadably received at one end thereof in said base ring member.

STEPHEN C. OLSZEWSKI.

References Cited in the file of this patent

UNITED STATES PATENTS

| Number | Name | Date |
| --- | --- | --- |
| 767,025 | Volker et al. | Aug. 9, 1904 |
| 839,885 | Patterson | Jan. 1, 1907 |
| 2,391,245 | Kail | Dec. 18, 1945 |
| 2,438,542 | Cushman | Mar. 30, 1948 |

FOREIGN PATENTS

| Number | Country | Date |
| --- | --- | --- |
| 17,032 | Great Britain | 1901 |